US011040769B2

(12) United States Patent
Schrauf et al.

(10) Patent No.: US 11,040,769 B2
(45) Date of Patent: Jun. 22, 2021

(54) LEADING EDGE STRUCTURE FOR A FLOW CONTROL SYSTEM OF AN AIRCRAFT

(71) Applicant: Airbus Operations GmbH, Hamburg (DE)

(72) Inventors: Geza Schrauf, Hamburg (DE); Christian Heck, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 427 days.

(21) Appl. No.: 16/030,261

(22) Filed: Jul. 9, 2018

(65) Prior Publication Data

US 2019/0016444 A1 Jan. 17, 2019

(30) Foreign Application Priority Data

Jul. 11, 2017 (DE) .................... 10 2017 115 558.9

(51) Int. Cl.
*B64C 21/02* (2006.01)
*B64C 3/26* (2006.01)
(Continued)

(52) U.S. Cl.
CPC ................ *B64C 21/02* (2013.01); *B64C 3/26* (2013.01); *B64C 5/02* (2013.01); *F15D 1/12* (2013.01);
(Continued)

(58) Field of Classification Search
CPC ........................... B64C 21/02; B64C 2230/22
See application file for complete search history.

(56) References Cited

U.S. PATENT DOCUMENTS 2,111,530 A 3/1938 Seversky
2,742,247 A * 4/1956 Lachmann ............. B64C 21/06 244/130
(Continued)

FOREIGN PATENT DOCUMENTS

DE 4436748 C1 9/1995
DE 10 2009 022 174 11/2010
(Continued)

OTHER PUBLICATIONS

European Search Report cited in 18181668.7 dated Nov. 9, 2018, 10 pages.
(Continued)

*Primary Examiner* — Philip J Bonzell
*Assistant Examiner* — Michael B Kreiner
(74) *Attorney, Agent, or Firm* — Nixon & Vanderhye P.C.

(57) ABSTRACT

A leading edge structure (1) for a flow control system of an aircraft, including a double-walled leading edge panel (3) that surrounds a plenum (7), wherein the leading edge panel (3) includes an inner wall element (21) facing the plenum (7) and an outer wall element (23) in contact with the ambient flow (25), wherein between the inner and outer wall elements (21, 23) the leading edge panel (3) includes elongate stiffeners (27) spaced apart from one another, so that between each pair of adjacent stiffeners (27) a hollow chamber (29) is formed between the inner and outer wall elements (21, 23), wherein the outer wall element (23) includes micro pores (31) forming a fluid connection between the hollow chambers (29) and an ambient flow (25), and wherein the inner wall element (21) includes openings (33) forming a fluid connection between the hollow chambers (29) and the plenum (7).

21 Claims, 3 Drawing Sheets

(51) Int. Cl.
*B64C 5/02* (2006.01)
*F15D 1/12* (2006.01)

(52) U.S. Cl.
CPC ...... *B64C 2230/08* (2013.01); *B64C 2230/20* (2013.01); *B64C 2230/22* (2013.01)

(56) References Cited

U.S. PATENT DOCUMENTS 3,203,648 A * 8/1965 Vanesian ................ B64C 21/06 244/209
3,213,527 A 10/1965 Glaze
3,429,023 A * 2/1969 Blythe .................... B64C 21/06 29/404
3,467,348 A * 9/1969 Lemelson ................ B64C 3/00 244/130
3,490,268 A * 1/1970 Silvergleit ............ G01M 99/00 73/40
4,000,869 A 1/1977 Wong
4,612,737 A * 9/1986 Adee .................... G10K 11/172 451/29
5,263,667 A * 11/1993 Horstman ............... B64C 21/06 244/209
5,316,032 A * 5/1994 DeCoux .................. B64C 21/06 137/14
5,366,177 A * 11/1994 DeCoux .................. B64C 21/06 244/201
5,398,410 A 3/1995 Yasui et al.
5,741,456 A * 4/1998 Ayrton ................. B23K 26/382 264/400
5,743,488 A 4/1998 Rolston et al.
5,806,796 A * 9/1998 Healey .................. B29C 70/088 244/117 R
5,841,079 A * 11/1998 Parente ................... B64C 23/00 181/214
5,848,768 A * 12/1998 Seyfang .................. B64C 23/00 244/198
5,899,416 A * 5/1999 Meister ................... B64C 21/06 244/207
5,923,003 A 7/1999 Arcas et al.
5,944,287 A * 8/1999 Rodgers .................. F02C 7/047 244/134 R
6,050,523 A 4/2000 Kraenzien
6,135,395 A * 10/2000 Collett .................... B64C 21/06 244/209
6,187,411 B1 * 2/2001 Palmer .................. B29C 70/543 428/102
6,302,360 B1 * 10/2001 Ng ......................... B64C 23/06 244/203
6,612,524 B2 9/2003 Billman et al.
6,622,973 B2 9/2003 Al-Garni et al.
6,752,358 B1 * 6/2004 Williams .................. B64C 3/26 244/208
7,048,230 B2 5/2006 Meyer
7,152,829 B2 * 12/2006 Bertolotti ................ B64C 21/06 244/209
7,673,832 B2 * 3/2010 Meister ................... B64C 21/08 244/123.1
7,743,884 B2 6/2010 Thomas et al.
7,866,609 B2 * 1/2011 Parikh ..................... B64C 21/06 244/209
7,879,276 B2 * 2/2011 Guzman ............... B29C 44/583 264/248
7,922,126 B2 * 4/2011 Meister ................. B64C 21/025 244/208
8,091,837 B2 * 1/2012 Frankenberger ........ B64C 21/06 244/209
8,128,037 B2 * 3/2012 Powell .................... B64C 21/08 244/208
8,282,037 B2 10/2012 Ashok
8,459,597 B2 6/2013 Cloft et al.
8,474,871 B1 * 7/2013 Ludwick .............. B62D 29/043 280/789
8,500,066 B2 * 8/2013 Lewis .................... B64D 45/00 244/119
8,540,921 B2 * 9/2013 Senibi ..................... B32B 27/00 264/321
8,596,573 B2 12/2013 Ashok
8,617,687 B2 * 12/2013 McCarville ............. B64C 1/061 428/117
8,636,865 B2 * 1/2014 Von Varendorff .... B29C 66/532 156/228
8,702,042 B2 * 4/2014 Gerber .................... B64C 21/06 244/209
8,800,915 B2 * 8/2014 Gerber .................... B64C 21/06 244/53 B
8,864,082 B2 * 10/2014 Syassen .................. B64C 21/06 244/209
9,193,443 B2 * 11/2015 Voege ..................... B64C 21/06
9,487,288 B2 * 11/2016 Rupp ...................... B64C 21/06
9,511,848 B2 * 12/2016 Gerber .................... B64C 21/06
9,623,959 B2 * 4/2017 Schrauf .................. B64C 21/06
10,005,545 B2 6/2018 Alderman et al.
10,183,740 B2 * 1/2019 Gerber .................... B64C 21/06
10,377,461 B2 * 8/2019 Jorn ........................ B64C 1/064
10,377,464 B2 * 8/2019 Cebolla Garrofe .......................... B29C 45/14475
10,442,526 B2 * 10/2019 Gueuning .............. B64D 15/04
10,513,326 B2 * 12/2019 Brakes ...................... B64C 3/26
10,532,807 B2 * 1/2020 Garcia Nieto .......... B64C 3/182
10,618,636 B2 * 4/2020 Mehring ................ B64D 13/08
2003/0132351 A1 7/2003 Billman et al.
2005/0045774 A1 3/2005 Hocking
2005/0151026 A1 7/2005 Meyer
2007/0221788 A1 9/2007 Meister
2008/0296439 A1 12/2008 Cloft et al.
2009/0210103 A1 8/2009 Cook
2009/0212165 A1 8/2009 Parikh
2010/0187360 A1 7/2010 Rawlings et al.
2010/0187361 A1 7/2010 Rawlings et al.
2010/0294892 A1 11/2010 Syassen
2011/0117338 A1 5/2011 Poquette et al.
2011/0212291 A1 9/2011 Buellesbach
2012/0052247 A1 * 3/2012 Pook ..................... B29C 66/472 428/161
2014/0021304 A1 1/2014 Gerber et al.
2015/0183513 A1 * 7/2015 Gerber ...................... B64C 5/06 244/130
2016/0375978 A1 * 12/2016 Joern .................... B29C 65/601 244/120
2019/0202566 A1 * 7/2019 Heck ......................... B64C 3/28

FOREIGN PATENT DOCUMENTS

DE 10 2010 014 640 A1 10/2011
DE 10 2010 014 641 A1 10/2011
DE 10 2010 036 154 A1 3/2012
EP 2886453 6/2015
EP 2 891 606 A1 7/2015
EP 3 159 259 4/2017
GB 718421 11/1954
GB 2 324 351 10/1998
GB 2234351 A 10/1998
WO 9221560 12/1992
WO 9847761 10/1998
WO 2005/113336 12/2005
WO 2009/023354 2/2009
WO 2011/128 069 A1 10/2011

OTHER PUBLICATIONS

Wong et al. "Drag Reduction Using Boundary Layer Suction and Blowing", CEAS/KATnet Conference on Key Aerodynamic Technologies (Jun. 2005).
Schrauf et al, "Simplified Science and Engineering Hybrid Laminar Flow Control", European Congress on Computational Methods in Applied CCOMAS 2004 (Jul. 2004).
Schrauf "Status and Perspective of Laminar Flow" The Aeronautical Journal, vol. 109, pp. 639-644 (Dec. 2005).

(56) References Cited

OTHER PUBLICATIONS

Wagner et al, "Laminar Flow Control Leading Edge Systems in Simulated Airline Service," 16$^{th}$ Congress of the International Council of the Aeronautical Sciences (Aug. 1988).
Braslow "A History of Suction-Type Division, Monographs in Aerospace Laminar Flow Control with Emphasis on Flight Research", NASA History Division, Monographs in Aerospace History, No. 13 (1999).
Wong et al, "Studies of Methods and Philosophies for Designing Hybrid Laminar Flow Wings," ICAS 2000 Congress, pp. 282.1 to 282.11 (Aug. 2000).
Joslin, "Aircraft Laminar Flow Control", Annular Review of Fluid Mechanics, vol. 30; pp. 1-29 (1998).
Henke, "A 320 HLF Fin: Flight Test Completed", Air & Space Europe, vol. 1, No. 2 (1999).
"Hight Reynolds Number Hybrid Laminar Flow Control (HLFC) Flight Experiment: IV Suction System Design and Manufacture", NSAS/CR-1999-209326 (Apr. 1999).
Schmitt et al, "Hybrid Laminar Fin Investigation", Paper RTO AVT Symposium on Active Technology for Enhanced Performance Operational Capabilities of Military Aircraft, Land Vehicles and Sea Vehicles, RTO MP-051 (May 2000).
Search Report for DE 10 2017 115 558.9, dated Mar. 5, 2018, 9 pages.

* cited by examiner

LEADING EDGE STRUCTURE FOR A FLOW CONTROL SYSTEM OF AN AIRCRAFT

RELATED APPLICATION

This application claims priority to German Patent Application 10 2017 115 558.9 filed Jul. 11, 2017, the entirety of which is incorporated by reference.

BACKGROUND

The present invention relates to a leading edge structure for a flow control system of an aircraft, in particular for a Hybrid Laminar Flow Control (HLFC) system, where air is sucked in or blown out of a porous surface of a flow body in order to extend the region of laminar flow along the flow body. Further aspects of the present invention relate to a vertical tail plane comprising such a leading edge structure, an aircraft comprising such a leading edge structure or such a vertical tail plane, and a method for manufacturing such a leading edge structure.

The leading edge structure comprises a double-walled leading edge panel is curved, such as arcuate, and surrounds a common plenum. The plenum extends in a span direction through the leading edge structure.

When viewed in a cross section across the span direction, the leading edge panel has a first side portion extending from a leading edge point, i.e. from a fore tip of the leading edge structure, to a first attachment end on a first side of the leading edge structure, the first attachment end being configured for attachment to a further structure located downstream from the leading edge. Further, the leading edge panel has a second side portion opposite the first side portion, wherein the second side portion extends from the leading edge point to a second attachment end on a second side of the leading edge structure opposite the first side, the second attachment end being configured for attachment to a further structure downstream from the leading edge.

The leading edge panel comprises an inner wall element facing the plenum and spaced apart from the inner wall an outer wall element in contact with the ambient flow. Between the inner and outer wall elements the leading edge panel comprises a plurality of elongate stiffeners connecting the inner and outer wall elements and spaced apart from one another, so that between each pair of adjacent stiffeners a hollow chamber is formed between the inner and outer wall elements. The outer wall element comprises a plurality of micro pores, such as perforations, forming a fluid connection between the hollow chambers and the ambient flow over the outer surface of the outer wall element. The inner wall element comprises openings forming a fluid connection between the hollow chambers and the plenum, wherein each hollow chamber may comprise at least one opening.

Such leading edge structures for flow control systems of aircrafts are known in the art. The known leading edge structures comprise a plurality of separate parts that have to be mounted together and that add to the overall weight of the aircraft.

SUMMARY

The invention may be embodied to provide a simple and light weight leading edge structure that meets the mechanic requirements.

To reduce the complexity and weight of leading edge structures incorporating HLFC systems, stiffeners, in particular at least some of the stiffeners, are formed integrally with an inner wall element of the leading edge structure. Integrally in this connection is to be understood as formed in one piece that is not separable or mounted together from separate components.

A leading edge structure with stiffeners formed integrally with the inner wall element allows for a simple and light weight construction, since fasteners, such as bolts or rivets, are not needed. Also, the integrated leading edge structure with stiffeners has improved mechanical properties which allow for weight savings by reducing the amount of material needed for the leading edge structure. Additionally, the manufacture of the leading edge structure is simplified and expedited by forming the inner wall element together with the stiffeners in a common process step(s), such as by Resin Transfer Molding (RTM).

The leading edge structure may further comprise a back wall, such as a wall formed of a CFRP material. The back wall may connect the first attachment end to the second attachment end of the leading edge panel, thereby enclosing the plenum together with the leading edge panel on a side opposite the leading edge point.

Openings for the leading structure may be formed as throttle holes having a predefined diameter adapted for a predefined mass flow rate through the throttle holes in order to achieve a predefined fluid pressure in the hollow chambers. In such a way, the air mass flow rate through the micro pores can be controlled by the fluid pressure in the hollow chambers and, thus, by the predefined diameter of the throttle holes. Alternatively, the openings might be formed such that they allow an uncontrolled air mass flow rate and are not adapted to control the fluid pressure in the hollow chambers, for example by a number of bores or by one large diameter hole. In this case, the fluid pressure in the hollow chambers corresponds to the fluid pressure in the plenum, so that the mass flow rate through the micro pores can be controlled only by the fluid pressure in the plenum. Whether the openings are formed as throttle hole or as simple openings not adapted for a specific mass flow rate, may vary from chamber to chamber.

The stiffeners may have a solid cross section with a square or trapezoid shape. In such a way, the stiffeners provide plane support surfaced for the inner and outer walls elements.

The stiffeners may extend in the span direction, i.e. in parallel to the leading edge point, and may be in parallel to one another. In such a way, the stiffeners may have a long extension.

The inner wall element may be formed of a Fiber Reinforced Plastic (FRP) material, such as from a Carbon Fiber Reinforced Plastic (CFRP) material. Further, the stiffeners might be formed as sandwich structures, each sandwich structure comprising a core element enveloped on opposite sides by separate layers of FRP of the inner wall element. Thus, the inner wall element may be formed of separate layers. One layer encloses the core element on the side facing the plenum, and forms the inner wall element in the region of the stiffeners. The other layer encloses the core element on the side facing the outer wall element or resting against the outer wall element. This layer may be in an omega shape, such as an omega-shaped cross section. In such a way, a simple, strong and light weight integral construction of the inner wall element and the stiffeners is provided. The core elements may be formed of a foam material. Foam has a high stiffness at a low weight.

A plurality of support ribs, e.g. frames, may be attached to the inner wall element in such a way that they face the plenum and extend across, such as perpendicular to, the span direction along the inner wall element. The support ribs stiffen the leading edge structure across the span direction. The support ribs may be formed integrally with the inner wall element. In such a way, the inner wall element can be formed as one piece together with both the stiffeners and the support ribs. This further simplifies the entire leading edge structure and reduces additional weight. The support ribs may be formed of FRP. This allows that the support ribs can easily be formed integrally with the inner wall element.

The outer wall element may be formed as a titanium sheet. Such titanium sheet provides the strength and stiffness required for the outer surface along the leading edge. The outer wall element may include multiple sections, when viewed from a leading edge downstream, i.e. in a chord direction. The porosity varies from one section to another in terms of pore diameter and/or pore pitch. The diameter may decrease and the pitch increasing from the leading edge downstream. In such a way, the mass flow rate of the air sucked in or blown out can be adapted to the demand. For example, in sections close to the leading edge point, where a higher mass flow rate is demanded, the pore diameter might be larger and/or the pore pitch might be smaller than in sections further downstream.

The present invention may be embodied as a vertical tail plane for an aircraft. The vertical tail plane may include a vertical tail plane box and a leading edge structure according to any of the afore-described embodiments. The vertical tail plane box has a first lateral panel with a first attachment portion and an opposite second lateral panel with a second attachment portion. Both the first attachment portion and the second attachment portion extend in the span direction. The first attachment end is attached to the first attachment portion and the second attachment end is attached to the second attachment portion, so that the first side portion of the leading edge panel forms a continuous, e.g., smooth, flow surface with the first lateral panel of the vertical tail plane box, and the second side portion of the leading edge panel forms a continuous, e.g., smooth, flow surface with the second lateral panel of the vertical tail plane box. The plenum may be in fluid connection with an adjustable rear-facing outlet flap for causing a vacuum in the plenum to draw ambient air through the micro pores and the hollow chambers into the plenum. Further the plenum may be in fluid connection with an adjustable fore-facing inlet flap for causing an overpressure in the plenum to blow out air from the plenum through the hollow chambers and the micro pores to the ambient. The rear-facing and fore-facing flaps may be provided in a cover panel on opposite sides of the vertical tail plane. The vertical tail plane may further comprise a connection duct connecting a lower end of the plenum to the outlet flap and/or to the inlet flap. The above explanations with respect to the leading edge structure also apply to the vertical tail plane.

The present invention may also be embodied in an aircraft comprising a leading edge structure according to any of the afore-described embodiments, or comprising a vertical tail plane according to any of the afore-described embodiments. The above explanations with respect to the leading edge structure and the vertical tail plane also apply to the aircraft.

The present invention may be embodied in a method for manufacturing a leading edge structure according to any of the afore-described embodiments, wherein the stiffeners and the inner wall element are formed together as an integral part, i.e. as one common part, by a Resin Transfer Molding RTM) process, in particular by a common RTM step. The support ribs may be formed as an integral part together with the inner wall element and the stiffeners by an RTM process. The above explanations with respect to the leading edge structure also apply to the present method.

SUMMARY OF DRAWINGS

Embodiment(s) of the present invention is explained hereinafter in more detail by means of the figures described below.

DETAILED DESCRIPTION

Figure 1:
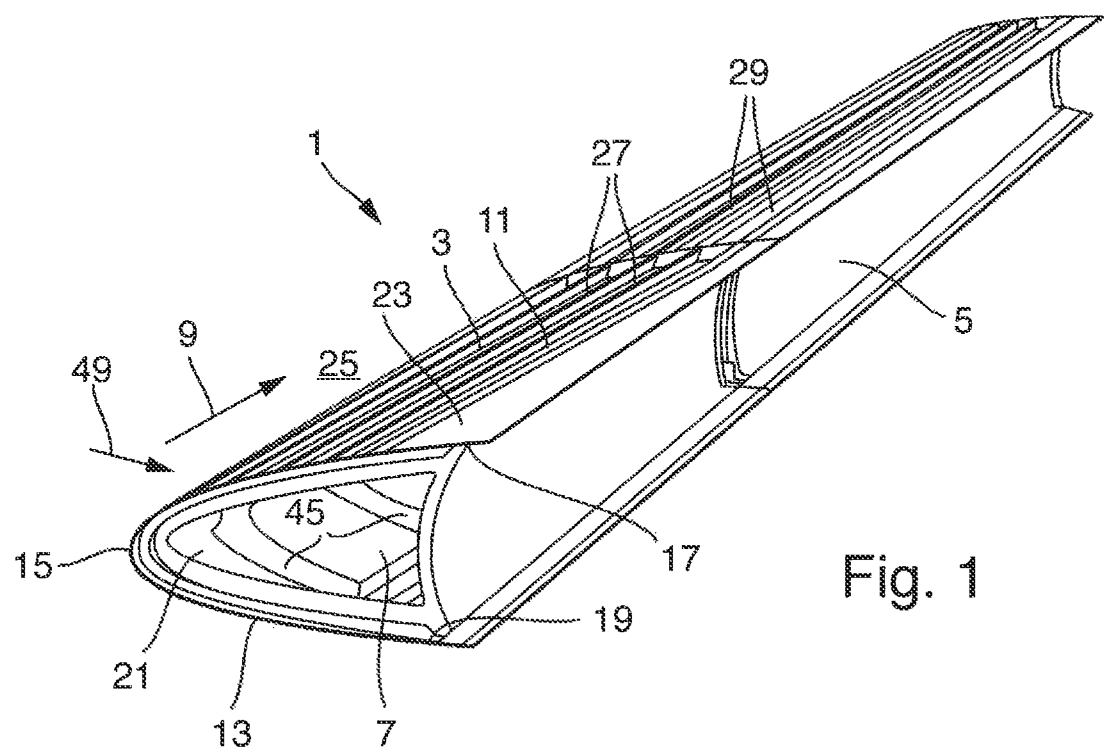
FIG. 1 is a perspective cut open view of an embodiment of a leading edge structure according to an embodiment of the invention.
Figure 2:
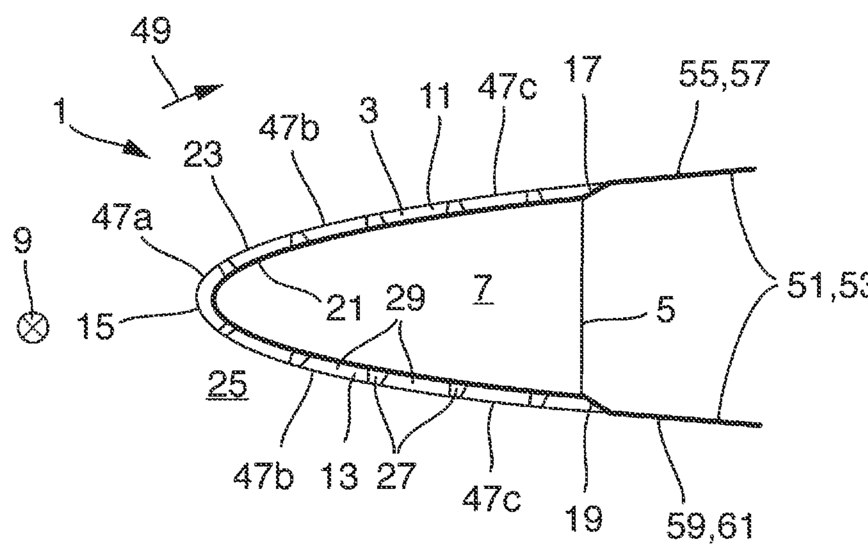
FIG. 2 is a cross sectional view across the span direction of the leading edge structure shown in FIG. 1.

FIGS. 1 and 2 show a novel leading edge structure 1 for a flow control system of an aircraft. The leading edge structure 1 comprises a double-walled leading edge panel 3 and a back wall 5.

Figure 3:
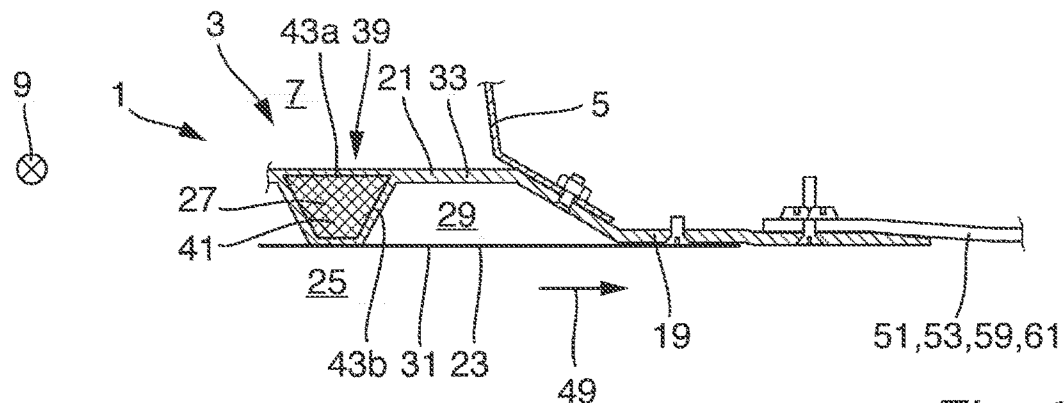
FIG. 3 is a detailed view of the second attachment end of the leading edge structure shown in FIG. 2.

The leading edge structure 1 surrounds a plenum 7 in a curved manner, wherein the plenum 7 extends in a span direction 9. The leading edge panel may form a U-shape in cross-section, wherein the plenum is within the U-shape. A back-wall 5 spans the ends of the U-shape of the leading edge panel and forms a back wall of the plenum. The leading edge panel 3 has a first side portion 11 and an opposite second side portion 13. The first side portion 11 extends from a leading edge point 15 to a first attachment end 17. The second side portion 13 extends from the leading edge point 15 to a second attachment end 19, as shown in FIG. 3.

The back wall 5 is formed as a membrane of CFRP material and connects the first attachment end 17 to the second attachment end 19 of the leading edge panel 3. In such a way, the back wall 5 encloses the plenum 7 together with the leading edge panel 3 on a side opposite the leading edge point 15.

Figure 4:
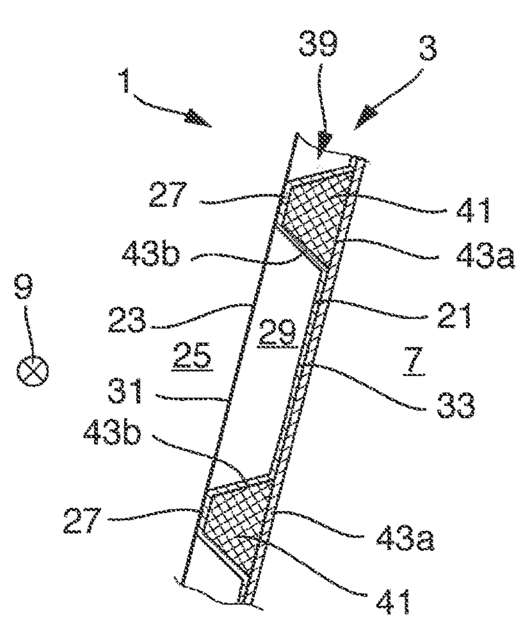
FIG. 4 is a detailed view of a hollow chamber of the leading edge structure shown in FIG. 2.

The leading edge panel 3 comprises an inner wall element 21 facing the plenum 7 and an outer wall element 23 in contact with an ambient flow 25. Between the inner and outer wall elements 21, 23 the leading edge panel 3 comprises a plurality of elongate stiffeners 27 spaced apart from one another, so that between each pair of adjacent stiffeners 27 a hollow chamber 29 is left open between the inner and outer wall elements 21, 23, as shown in FIG. 4. The stiffeners 27 extend in the span direction 9 in parallel to the leading edge point 15 and in parallel to one another.

Figure 5:
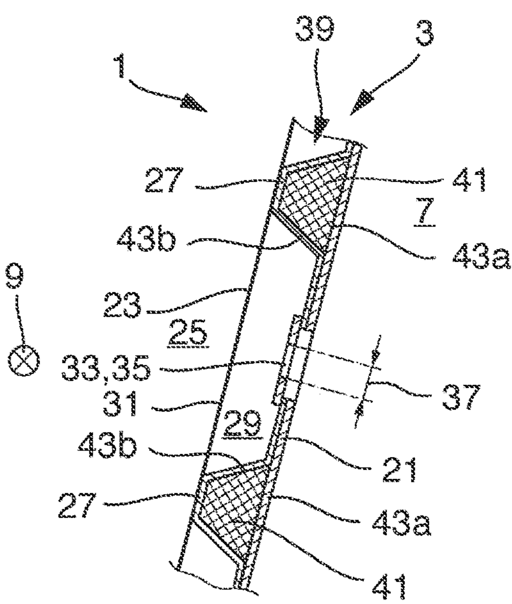
FIG. 5 is a detailed view of another hollow chamber of the leading edge structure shown in FIG. 2, wherein the inner wall element has an opening formed as a throttle hole.

The outer wall element 23 comprises a plurality of micro pores 31 forming a fluid connection between the hollow chambers 29 and the ambient flow 25. The inner wall element 21 comprises openings 33 forming a fluid connection between the hollow chambers 29 and the plenum 7. At some of the hollow chambers 29, the openings 33 are formed as throttle holes 35 having a predefined diameter 37 adapted for a predefined mass flow rate through the throttle holes 35 in order to achieve a predefined fluid pressure in the hollow chambers 29, as it is shown in FIG. 5. However, at others of the hollow chambers 29, the openings 33 are formed to allow a random mass flow rate and are not adapted to control the fluid pressure in the hollow chambers 29, as it is the case in the hollow chamber 29 shown in FIG. 4.

The stiffeners 27 are formed integrally with the inner wall element 21. The inner wall element 21 is formed of a Carbon Fiber Reinforced Plastic (CFRP). The stiffeners 27 have a solid trapezoid-shaped cross section and are formed as sandwich structures 39. Each sandwich structure 39 comprises a core element 41 enveloped on opposite sides by separate layers 43*a*, 43*b* of CFRP of the inner wall element 21, wherein one layer 43*a* encloses the core element 41 on the side facing the plenum 7, while the other layer 43*b* encloses the trapezoid surface of the core element 41 on the side facing the outer wall element 23 by an omega-shape curve. The core elements 41 are formed of a foam material.

As shown in FIG. 1, a plurality of support ribs 45 are attached to the inner wall element 21 in such a way that they face the plenum 7 and extend perpendicular to the stiffeners 27 and to the span direction 9 along the inner wall element 21. The support ribs 45 are formed integrally with the inner wall element 21 and are also formed of a CFRP material.

The outer wall element 23 is formed as a titanium sheet and comprises multiple sections 47*a*, 47*b*, 47*c* arranged subsequently in a chord direction 49. The porosity varies from one section 47*a* to another section 47*b*, 47*c* in terms of the pore pitch, wherein the pore pitch increases from the leading edge point 15 downstream.

Figure 6:
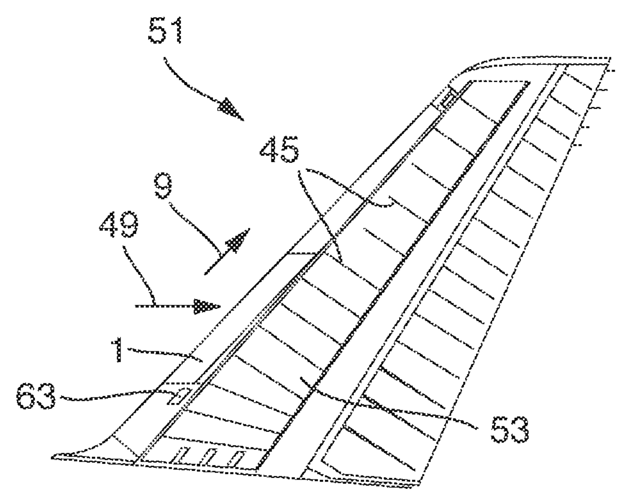
FIG. 6 is a side view of a vertical tail plane for an aircraft comprising the leading edge structure shown in FIG. 1.
Figure 7:
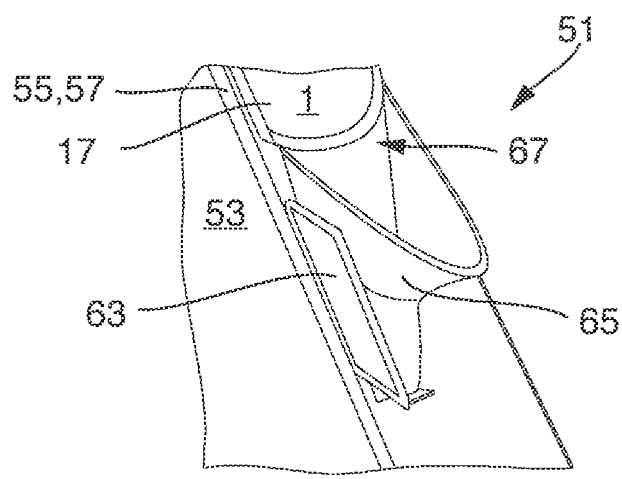
FIG. 7 is a detailed perspective view of a connection duct of the vertical tail plane shown in FIG. 6.
Figure 8:
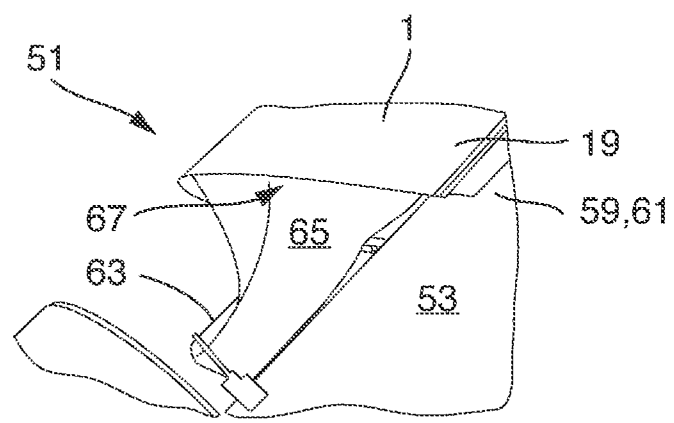
FIG. 8 is another perspective view of the connection duct shown in FIG. 7.

FIGS. 6 to 8 show a vertical tail plane 51 for an aircraft. The vertical tail plane 51 comprises a vertical tail plane box 53 and a leading edge structure 1 as described before. The vertical tail plane box 53 has a first lateral panel 55 with a first attachment portion 57 and an opposite second lateral panel 59 with a second attachment portion 61. The first attachment end 17 of the leading edge panel 3 is attached to the first attachment portion 57 and the second attachment end 19 of the leading edge panel 3 is attached to the second attachment portion 61. The first side portion 11 of the leading edge panel 3 forms a continuous flow surface with the first lateral panel 55 of the vertical tail plane box 53, and the second side portion 13 of the leading edge panel 3 forms a continuous flow surface with the second lateral panel 59 of the vertical tail plane box 53. The plenum 7 is in fluid connection with an adjustable rear-facing outlet flap 63 for causing a vacuum in the plenum 7 to draw air from the ambient flow 25 through the micro pores 31 and the hollow chambers 29 into the plenum 7. The ambient flow 25 may be the boundary layer air flowing over the outer surface of the outer wall element 23 of the leading edge panel 3 such as while the aircraft is in flight.

As shown in FIGS. 7 and 8, the vertical tail plane 51 further comprises a connection duct 65 connecting a lower end 67 of the plenum 7 to the outlet flap 63. In addition to the outlet flap 63 the plenum 7 might also be in fluid connection with a fore-facing inlet flap (not shown) for causing an overpressure in the plenum 7 to blow out air from the plenum 7 through the hollow chambers 29 and the micro pores 31 to the ambient flow 25.

The leading edge structure 1 shown in FIGS. 1 to 5 can be manufactured by a method including a Resin Transfer Molding (RTM) process. The stiffeners 27 and the support ribs 45 are formed together with the inner wall element 21 as an integral part in a common RTM step.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A leading edge structure for a flow control system of an aircraft, the leading edge structure comprising a double-walled leading edge panel that surrounds a plenum in a curved manner, the plenum extending in a span direction, wherein the leading edge panel has a first side portion extending from a leading edge point to a first attachment end, wherein the leading edge panel has a second side portion opposite the first side portion, extending from the leading edge point to a second attachment end, wherein the leading edge panel comprises an inner wall element facing the plenum and an outer wall element in contact with the ambient flow, wherein at least the inner wall element includes layers of fiber reinforced plastic, wherein between the inner and outer wall elements, the leading edge panel comprises a plurality of elongate stiffeners spaced apart from one another, so that between each pair of adjacent stiffeners a hollow chamber is formed between the inner and outer wall elements, wherein the outer wall element comprises a plurality of micro pores forming a fluid connection between the hollow chambers and an ambient flow, wherein the inner wall element comprises openings forming a fluid connection between the hollow chambers and the plenum, wherein the elongate stiffeners are formed integrally with the inner wall element, and wherein each of the elongate stiffeners includes a core sandwiched between the layers of fiber reinforced plastic of the inner wall element.

2. The leading edge structure according to claim 1, further comprising a back wall connecting the first attachment end to the second attachment end of the leading edge panel, thereby enclosing the plenum on a side opposite the leading edge point.

3. The leading edge structure according to claim 1, wherein the openings are formed as throttle holes each having a predefined diameter adapted for a predefined mass flow rate through the throttle holes in order to achieve a predefined fluid pressure in the hollow chambers.

4. The leading edge structure according to claim 1, wherein each of the stiffeners has a solid shape in cross section and the solid shape is one of a square or a trapezoid.

5. The leading edge structure according to claim 1, wherein the stiffeners extend in the span direction.

6. The leading edge structure according to claim 1, wherein the core of each of the stiffeners is a solid structure.

7. The leading edge structure according to claim 6, wherein the cores of the stiffeners are formed of a foam material.

8. The leading edge structure according to claim 1, wherein support ribs are attached to the inner wall element in such a way that the support ribs face the plenum and extend across the span direction along the inner wall element.

9. The leading edge structure according to claim 8, wherein the support ribs are formed integrally with the inner wall element to form a single piece molded component.

10. The leading edge structure according to claim 8, wherein the support ribs are formed of a fiber reinforced plastic (FRP).

11. The leading edge structure according to claim 1, wherein the outer wall element is formed as a titanium sheet.

12. The leading edge structure according to claim 1, wherein the outer wall element comprises multiple sections, wherein the porosity varies from one section of the multiple sections to another section of the multiple sections and the variation in porosity is in terms of pore diameter and/or pore pitch of the micro holes in the outer wall element.

13. A vertical tail plane for an aircraft comprising a vertical tail plane box having a first lateral panel with a first attachment portion and an opposite second lateral panel with a second attachment portion, a leading edge structure comprising a double-walled leading edge panel that surrounds a plenum in a curved manner, the plenum extending in a span direction, wherein the leading edge panel has a first side portion extending from a leading edge point to a first attachment end, wherein the leading edge panel has a second side portion opposite the first side portion, and the second side portion extends from the leading edge point to a second attachment end, wherein the leading edge panel comprises an inner wall element facing the plenum and an outer wall element configured to contact with ambient air flow over the vertical tail plane, wherein between the inner and outer wall elements, the leading edge panel comprises a plurality of elongate stiffeners spaced apart from one another, so that between each pair of adjacent stiffeners a hollow chamber is formed between the inner and outer wall elements, wherein the outer wall element comprises a plurality of micro pores forming a fluid connection between the hollow chambers and an ambient flow, wherein the inner wall element comprises openings forming a fluid connection between the hollow chambers and the plenum, wherein the elongate stiffeners are formed integrally with the inner wall element, wherein the first attachment end is attached to the first attachment portion, and wherein the second attachment end is attached to the second attachment portion, so that the first side portion of the leading edge panel forms a continuous flow surface with the first lateral panel of the vertical tail plane box, and the second side portion of the leading edge panel forms a continuous flow surface with the second lateral panel of the vertical tail plane box, wherein the plenum is in fluid connection with a rear-facing outlet flap for causing a vacuum in the plenum to draw air from the ambient flow through the micro pores and the hollow chambers into the plenum, wherein the plenum is in fluid connection with a fore-facing inlet flap for causing an overpressure in the plenum to blow out air from the plenum through the hollow chambers and the micro pores to the ambient flow, and wherein the vertical tail plane further comprises a connection duct connecting a lower end of the plenum to the outlet flap and/or to the inlet flap.

14. A leading edge structure for a vertical tail plane, the leading edge structure comprising:

a double-walled structure which extends in a spanwise direction of the vertical tail plane, and is U shaped in a cross section in a chordwise direction of the vertical tail plane;

an outer wall panel of the doubled-walled leading edge forms a leading edge of the vertical tail plane, wherein the outer wall panel is perforated with micro-pores which allow air to flow through the outer wall panel;

an inner wall panel of the doubled-wall leading edge, wherein the inner wall panel is seated within the outer-wall panel, is co-extensive in the spanwise direction with the outer wall panel, includes openings configured to allow air passing through the outer wall panel to flow into or out of a plenum within the doubled-walled structure, and the inner wall panel is formed of layers of fiber reinforced plastic; and stiffeners sandwiched between the inner wall panel and the outer wall panel, wherein the stiffeners are oriented in the spanwise direction;

wherein the plenum is defined, in part, by the inner wall panel which forms an outer wall of the plenum;

wherein the inner wall panel and the stiffeners are an integral, single piece component and each of the stiffeners includes at least one of the layers of the inner wall panel and a core sandwiched between the layers of fiber reinforced plastic of the inner wall panel.

15. The leading edge structure of claim 14 wherein the inner wall panel and stiffeners are a molded component formed of a fiber reinforced plastic material.

16. The leading edge structure of claim 14 further comprising a back wall attached to side edges of at least one of the outer wall panel and the inner wall panel, wherein the back wall defines a back of the plenum.

17. The leading edge structure of claim 14 wherein, for each of the stiffeners, an outer surface of the stiffener is formed by the at least one layer of the inner wall panel.

18. The leading edge structure of claim 14 wherein each of the stiffeners has a solid trapezoid-shaped in a cross section taken along the chordwise direction.

19. The leading edge structure of claim 14, wherein the core in each of the stiffeners is a foam material.

20. The leading edge structure of claim 14 further comprising a flap in the double-walled structure, wherein the flap is at a lower region of the vertical tail plane and the flap opens to allow air to flow through the flap between the plenum and ambient air outside of the vertical tail plane.

21. The leading edge structure of claim 14 wherein the outer wall panel includes:

a first side panel portion extending from a leading edge line to a first attachment end on a first side of the vertical tail plane, and a second side panel portion extending from the leading edge line to a second attachment end on a second side, opposite to the first side, of the vertical tail plane.

* * * * *